A. C. HANSEN.
MACHINE FOR REMOVING NUBBINS FROM CORN EARS.
APPLICATION FILED FEB. 28, 1914.
1,116,697.
Patented Nov. 10, 1914.
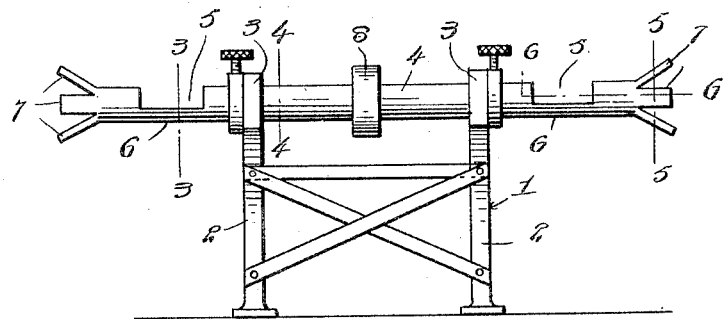
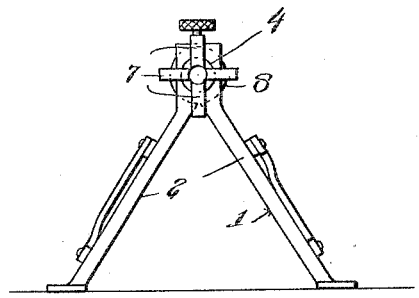
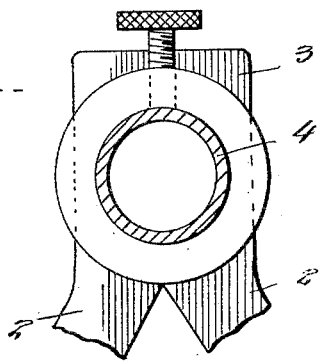
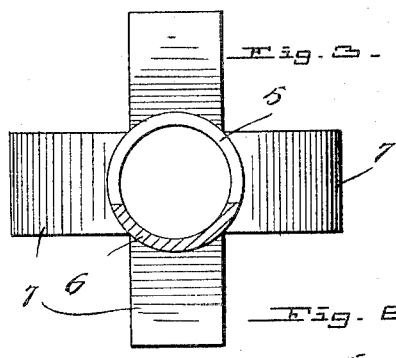
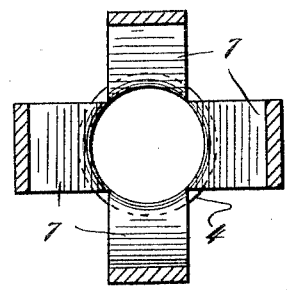

UNITED STATES PATENT OFFICE.

ALFRED C. HANSEN, OF WILLIS, KANSAS.

MACHINE FOR REMOVING NUBBINS FROM CORN-EARS.

1,116,697.   Specification of Letters Patent.   Patented Nov. 10, 1914.

Application filed February 28, 1914. Serial No. 821,716.

*To all whom it may concern:*

Be it known that I, ALFRED C. HANSEN, a citizen of the United States, residing at Willis, in the county of Brown, State of Kansas, have invented certain new and useful Improvements in Machines for Removing Nubbins from Corn-Ears; and I do hereby declare the following to be a full, clear, and exact description of the invention, such as will enable others skilled in the art to which it appertains to make and use the same.

The present invention is directed to improvements in machines for removing nubbins from ears of corn, and has for its object to so construct a device of this character that the operator can grasp an ear of corn and hold the same in a manner so that the nubbins can be quickly removed.

A further object of the invention is to combine with a machine of this type means for removing putrid grains from the ear singly or by the row, according to the condition of the ear.

With these and other objects in view, this invention resides in the novel features of construction, formation, combination and arrangement of parts to be hereinafter more fully described, claimed and illustrated in the accompanying drawing, in which:—

Figure 1 is a side elevation of the machine. Fig. 2 is an end view. Fig. 3 is a sectional view on line 3—3 of Fig. 1. Fig. 4 is a similar view on line 4—4 of Fig. 2. Fig. 5 is a similar view on line 5—5 of Fig. 1. Fig. 6 is a similar view on line 6—6 of Fig. 1.

Referring to the drawing, the numeral 1 designates a frame which consists of convergingly arranged legs 2, the upper end of which being equipped with bearings 3 in which is journaled the tubular shaft 4. The shaft 4 is provided adjacent its ends with cut away portions 5 which produce nubbin engaging webs 6.

The tubular shaft 4 has formed integral with its outer ends inclined fingers 7, which are formed by sawing the ends of the shaft and bending the resultant fingers.

Fixed centrally of the shaft 4 is a belt pulley 8 which is driven by a belt (not shown) so as to impart rotary movement to the shaft 4.

In operation the ear of corn having nubbins thereon is grasped by the operator and held in the cut-out portions 5 so that during the rotation of the shaft the web 6 will engage the nubbin and knock the same from the ear. When it is desired to remove putrid kernels or grains, the ear of corn is held in the path of movement of the outer ends of the fingers 7 so as they rapidly rotate the kernels can be removed a row at a time, or as the occasion may require.

What is claimed is:—

In a machine of the class described, a tubular rotary shaft having cutaway portions formed adjacent its ends, the ends of said shaft being provided with a plurality of outwardly inclined fingers adapted to remove kernels from an ear of corn when said ear is held in the path of rotary movement of the fingers.

In testimony whereof, I affix my signature, in presence of two witnesses.

ALFRED C. HANSEN.

Witnesses:
J. F. DAGUE,
SARAH A. DAGUE.

---

Copies of this patent may be obtained for five cents each, by addressing the "Commissioner of Patents, Washington, D. C."